April 4, 1950 M. L. COHN 2,502,826
PIPE PULLER
Filed March 27, 1948
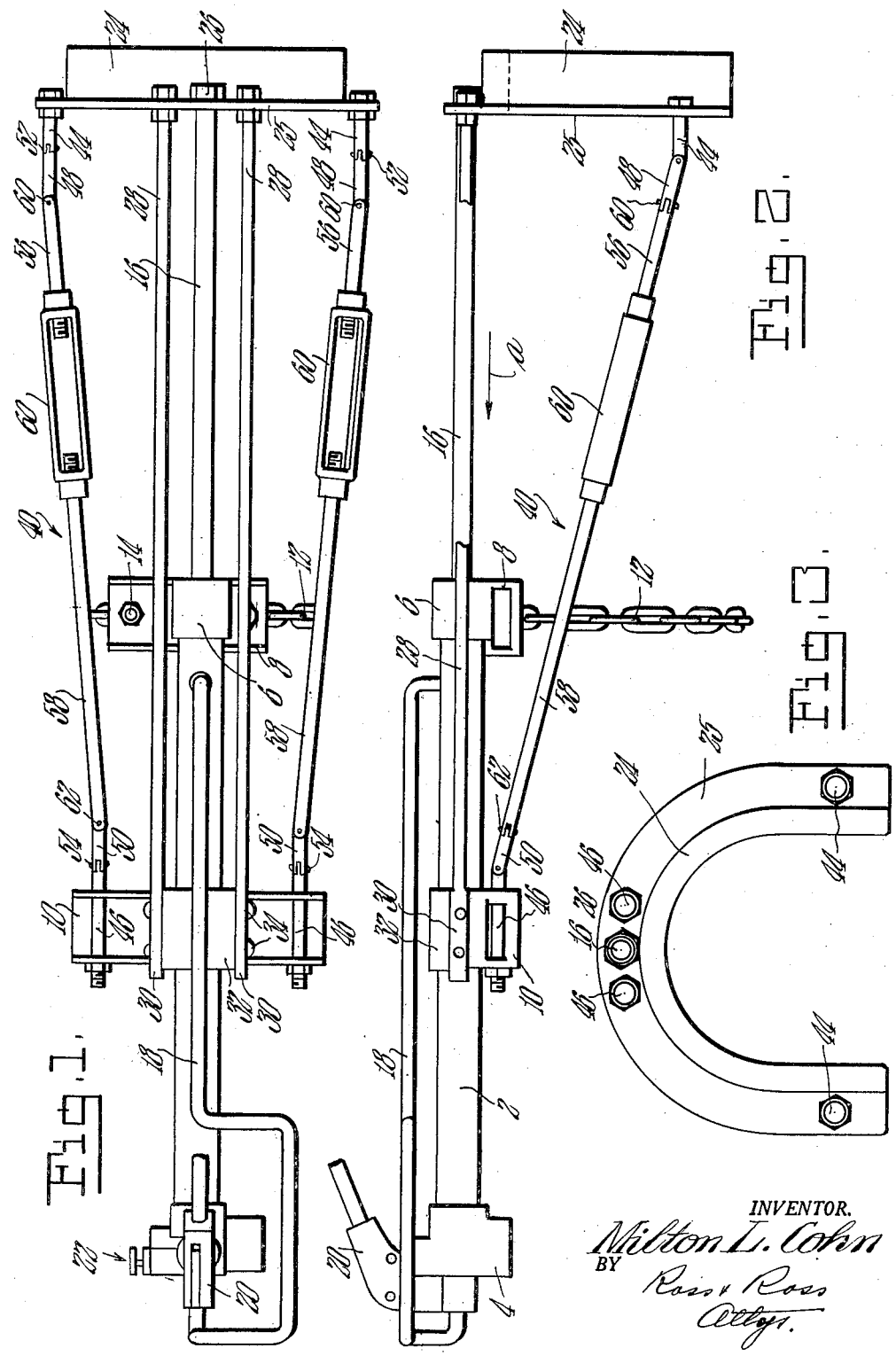
INVENTOR.
Milton L. Cohn
BY Ross & Ross
Attys.

Patented Apr. 4, 1950

2,502,826

UNITED STATES PATENT OFFICE 2,502,826

PIPE PULLER

Milton L. Cohn, Tampa, Fla.

Application March 27, 1948, Serial No. 17,479

2 Claims. (Cl. 254—29)

This invention relates to a pipe puller or apparatus for moving pipes longitudinally toward one another.

The principal object of the invention is the provision of apparatus for shifting or moving pipes relative to one another in order to bring adjacent ends thereof into the desired relation.

According to novel features of the invention, the apparatus includes means for securing to a length of pipe which has associated therewith means for gripping and moving another pipe whereby with the apparatus connected with the end portion of one length of pipe, another length may be moved longitudinally into the desired position relative thereto.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a plan view of apparatus embodying the novel features of the invention;

Fig. 2 is a side elevational view of the apparatus shown in Fig. 1; and

Fig. 3 is an elevational view of the front end of the apparatus shown in Figs. 1 and 2.

Referring now to the drawings more in detail, the invention will be fully described.

A cylinder 2 is provided which is closed at its rear end by a cap construction 4 and by an end cap 6 at its forward end which is a part of a front foot 8.

A slide 10 is provided which is adapted to reciprocate back and forth along the cylinder 2. The members 4 and 8 are adapted to lie on a horizontally disposed pipe and means is provided for securing the member 6 to the pipe against axial movement. Such means preferably includes a belly chain 12 which may have opposite ends secured to the member 8 in any convenient way as by bolt 14. The chain, of course, will be arranged or adjusted on the pipe to securely grip it and prevent movement of the member 8 thereon.

A piston rod 16 is provided which has a piston not shown within the cylinder and said piston may be of any well known form.

A pipe 18 connects the cap 4 and forward end of the cylinder 2 and a pump piston within the cap which is actuated by a lever 20 is provided so that liquid of any suitable form in the system may be pumped by swinging movement of the lever to actuate on the piston and move the piston and rod rearwardly in the direction of arrow A.

A relief valve is indicated by 22 to relieve pressure within the system when desired. The piston and relief valve may be of any well known form adapted to force liquid forwardly through the pipe 18 to act on and move the piston and rod rearwardly.

A collar 24 is provided which will preferably be so formed as to slip down and around a length of pipe and the piston rod extends through a flange 25 of the collar and has a nut 26 on the outer end thereof. As the piston rod moves rearwardly, the collar 24 is propelled rearwardly thereby.

Upper rods 28 have foot ends which are screw threaded and extend through the flange of the collar and are provided with nuts to secure the forward end of the upper rods to the collar. Rear ends 30 of the upper rods 28 are secured to an upper portion 32 of the member 10 by any suitable means so as bolts 34.

As the collar is moved rearwardly, the member 10 through the rods is moved thereby.

Lower rods 40 have ends 44 and 46 which are secured in some suitable manner to the collar and to the member 10.

Members 48 and 50 are pivoted at 52 and 54 to the members 44 and 46. Rods 56 and 58 have their outer ends pivotally connected at 60 and 62 to the members 48 and 50 and have opposite threaded ends in engagement with turnbuckle 60.

As the collar is moved rearwardly toward the member 8 so as to move the member 10 rearwardly through the rods 28, the lower rods 40 act on the collar.

The members 44 of the lower rods are connected to the collar near the lower sides thereof so that the pull of the rods on the collar is distributed in such a manner that the collar will not tilt.

In use, the member 8 is secured to one length of pipe by means of the belly chain with the collar disposed on and around an adjacent length of pipe which it is desired to move toward the first mentioned length.

The length of pipe to be moved may have a collar or any desired means thereon rearwardly of the collar so that as the collar is moved rearwardly it acts on the means on the pipe to move it.

With the apparatus associated with adjacent lengths of pipe as described, pressure is applied to the forward end of the cylinder by means of the pump so that the piston of rod 16 is acted upon whereby the collar acting on the pipe moves the pipe with which it is associated toward the member 8 and in this way the end of one pipe may be brought into the desired relationship with the end of another pipe.

While the invention has been described in connection with moving one section of pipe relative to another, the novel features are adapted for broad application to provide structures for various and sundry purposes.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Apparatus for longitudinally moving aligned elongated pipes toward one another comprising in combination, an elongated cylinder for a piston having a transverse end foot at its forward end for resting on one pipe with the cylinder disposed over and substantially parallel with said pipe, a belly chain having one end secured to one side of said foot and a free end portion for extending downwardly and around said pipe, bolt means at the other side of said foot for engaging the free end portion of said chain, a piston rod extending from the forward end of said cylinder slidable back and forth relative thereto, a collar in the form of an inverted U having an upper transverse portion for resting on the upper portion of another pipe adjacent said one pipe and side portions extending downwardly therefrom for disposition at the sides of said other pipe and having lower free ends, the forward end of said piston rod being secured to the upper portion of said collar, a slide reciprocable back and forth on said cylinder rearwardly of said end foot, spaced upper elongated straight rods at either side of said piston rod having inner rear ends secured to said slide and extending forwardly therefrom in parallelism with said piston rod, outer forward ends of said rods secured to the upper portion of said collar, other lower spaced rod members having rear inner ends secured to opposite sides of said slide below said upper rods, said lower rod members extending forwardly, outwardly and downwardly from said slide and diverging from one another and from said upper rods, and outer ends of said lower rods secured to the free ends of the side portions of the collar.

2. Apparatus for longitudinally moving aligned elongated pipes toward one another comprising in combination, an elongated cylinder for a piston having a transverse end foot at its forward end for resting on one pipe with the cylinder disposed over and substantially parallel with said pipe, a belly chain having one end secured to one side of said foot and a free end portion for extending downwardly and around said pipe, bolt means at the other side of said foot for engaging the free end portion of said chain, a piston rod extending from the forward end of said cylinder slidable back and forth relative thereto, a collar in the form of an inverted U having an upper transverse portion for resting on the upper portion of another pipe adjacent said one pipe and side portions extending downwardly therefrom for disposition at the sides of said other pipe and having lower free ends, the forward end of said piston rod being secured to the upper portion of said collar, a slide reciprocable back and forth on said cylinder rearwardly of said end foot, spaced upper elongated straight rods at either side of said piston rod having inner rear ends secured to said slide and extending forwardly therefrom in parallelism with said piston rod, outer forward ends of said rods secured to the upper portion of said collar, other lower spaced rod members having rear inner ends secured to opposite sides of said slide below said upper rods, said lower rod members extending forwardly, outwardly and downwardly from said slide and diverging from one another and from said upper rods, and outer ends of said lower rods secured to the free ends of the side portions of the collar, said lower rod members including adjacent inner sections having adjacent inner ends engaging a turnbuckle and pivoted together end sections.

MILTON L. COHN.

REFERENCES CITED

The following references are of record in the file of this patent:

UNITED STATES PATENTS

| Number | Name | Date |
|---|---|---|
| 409,008 | Breymann | Aug. 13, 1889 |
| 1,894,835 | Smith et al. | Jan. 17, 1933 |
| 2,229,248 | Lamb et al. | Jan. 21, 1941 |